United States Patent
Troxler

(10) Patent No.: US 9,829,585 B2
(45) Date of Patent: Nov. 28, 2017

(54) SYSTEMS AND METHODS FOR HIGH VOLTAGE CONVERSION AND MULTIPLICATION FOR IONIZING RADIATION DETECTION

(71) Applicant: Robert Ernest Troxler, Raleigh, NC (US)

(72) Inventor: Robert Ernest Troxler, Raleigh, NC (US)

(73) Assignee: Robert E. Troxler, Raleigh, NC (US)

( * ) Notice: Subject to any disclaimer, the term of this patent is extended or adjusted under 35 U.S.C. 154(b) by 927 days.

(21) Appl. No.: 14/214,550

(22) Filed: Mar. 14, 2014

(65) Prior Publication Data

US 2017/0307768 A1 Oct. 26, 2017

Related U.S. Application Data

(60) Provisional application No. 61/785,869, filed on Mar. 14, 2013.

(51) Int. Cl.
 *G01T 1/24* (2006.01)
 *G01V 5/10* (2006.01)
 *G01T 3/00* (2006.01)

(52) U.S. Cl.
 CPC ............... *G01T 1/24* (2013.01); *G01T 3/008* (2013.01); *G01V 5/10* (2013.01)

(58) Field of Classification Search
 CPC ............. G01T 1/24; G01T 3/008; G01V 5/10
 See application file for complete search history.

(56) References Cited

U.S. PATENT DOCUMENTS

| | | | | |
|---|---|---|---|---|
| 5,594,256 A | * | 1/1997 | Siebert | G02F 1/0327 250/214 R |
| 2006/0186341 A1 | * | 8/2006 | Ueno | G01T 1/2985 250/363.05 |
| 2012/0049054 A1 | * | 3/2012 | Zhou | B82Y 15/00 250/265 |

* cited by examiner

*Primary Examiner* — David Porta
*Assistant Examiner* — Faye Boosalis
(74) *Attorney, Agent, or Firm* — Olive Law Group, PLLC

(57) ABSTRACT

Systems and methods for high voltage conversion and multiplication for ionizing radiation detection are disclosed. According to an aspect, an electronic device comprises at least one detector configured for detecting ionizing radiation. Further, the electronic device comprises a translator assembly coupled to the at least one detector and configured to convert a voltage from a first voltage level to a second voltage level, wherein the at least one detector operates at the first voltage level. Further, the translator assembly is configured to voltage isolate the at least one detector operating at the first voltage level from a coupled electronic circuit operating at the second voltage level.

51 Claims, 6 Drawing Sheets

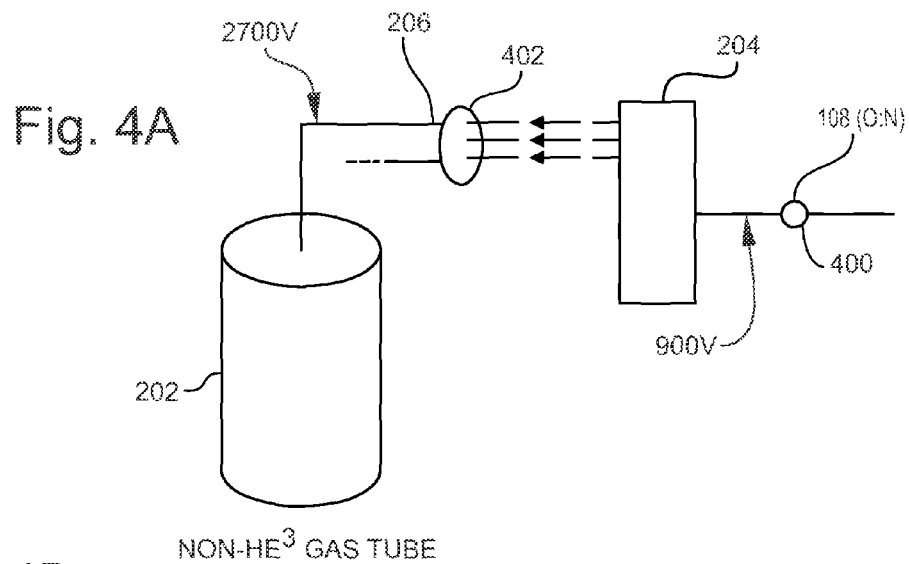
Fig. 4A
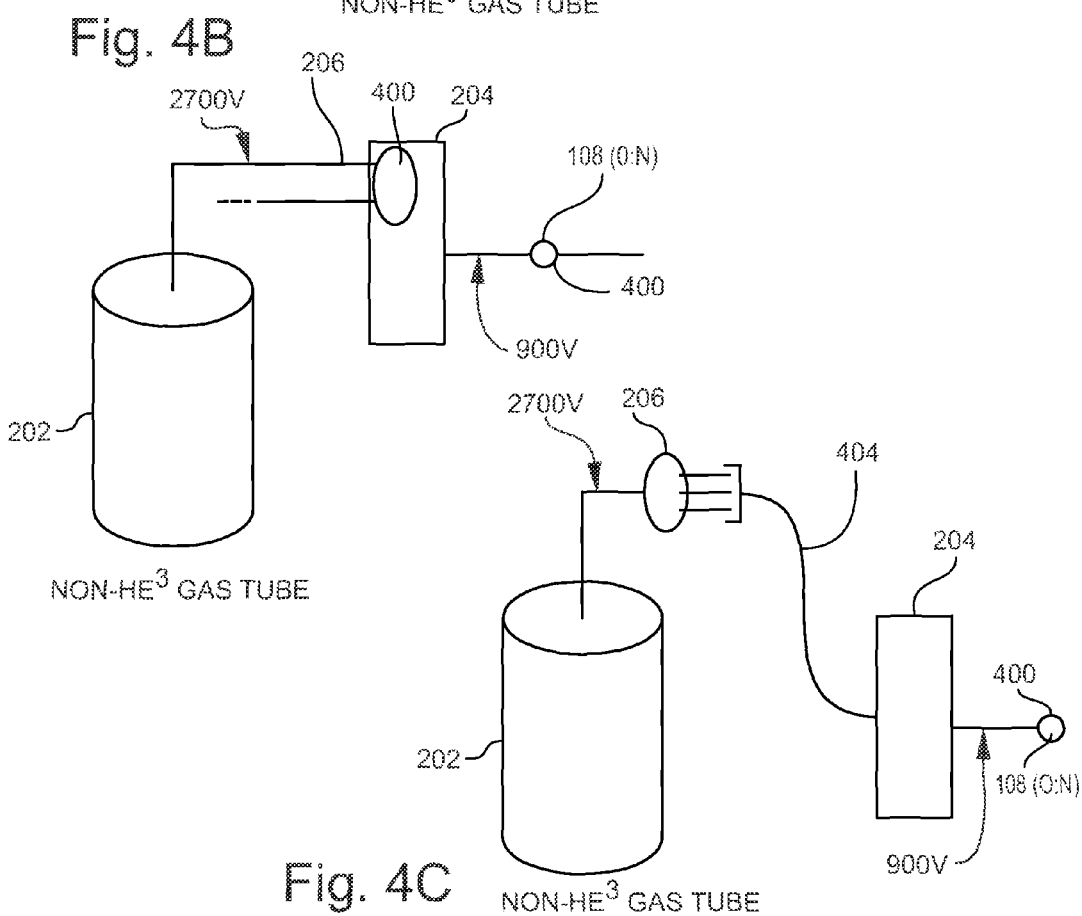
Fig. 4B
Fig. 4C

SYSTEMS AND METHODS FOR HIGH VOLTAGE CONVERSION AND MULTIPLICATION FOR IONIZING RADIATION DETECTION

CROSS REFERENCE TO RELATED APPLICATIONS

This application claims the benefit of U.S. Provisional Patent Application No. 61/785,869, filed Mar. 14, 2013 and titled BF3 GAS DETECTOR, the content of which is hereby incorporated herein by reference in its entirety.

TECHNICAL FIELD

This invention relates to high voltage conversion and multiplication for radiation detection. In particular, it relates to an integration of an electronic device and gas tube and method for coupling gas tubes of different types for radiation detection.

BACKGROUND

There are several types of detection technologies for ionizing radiation, many of which use high voltage sources from several hundred to several thousand volts. Typically, a proportional counter based on He3 is used to detect ionizing radiation. Shortly after September of 2001 the demand for He3 rose significantly resulting in a substantial increase in the He3 price. This was mainly the result of Homeland Security and other governmental agencies that began to systemically deplete the supply by installing new He3 ionizing radiation detectors at ports and borders. In 2008 the United States used about 80,000 L of He3 gas, almost half of the supply, prompting the significant increase in He3 price. The supply of He3 is determined by the decay of Tritium, a slow process. Thus the supply is limited and cannot be easily replaced.

There are at least 3 main alternatives to He3:Boron 10, Boron Triflouride (BF3) and Lithium-6. Boron 10 and BF3 based ionizing radiation detectors detect neutrons by electronically measuring a charge emission, and Lithium-6 detects absorbed neutrons by scintillated light. Prior to He3 based ionizing radiation detectors, the industry commonly used BF3 for detection. The main problem with a substantially pure BF3 detector is its toxicity; however, it is also less efficient than He3 detectors, so the ionizing detector made singularly of BF3 has to be physically larger. Furthermore the operating voltage is significantly higher, and the resulting waveforms can be significantly different depending on the inherent properties of the detector and the surrounding circuitry. Other ionizing detector options include Boron or Lithium doped semiconductors, Li6 glass fibers, solid state detectors, proportional counters, ionization chambers and processes, plastic detectors and Geiger Mueller tubes. The problem with all the different detectors is they all use different biasing voltages. So systems designed for a particular detector cannot change without a major overhaul. For example, a He3 based ionizing radiation detector may require 1000V while a BF3 based ionizing radiation detector requires 3000V, Lithium doped and other semiconductors require much lower voltages to operate. As He3 gas becomes increasingly scarce, it is desired to explore other detector technologies that can directly replace or be substituted for direct replacement of He3 gas tubes in He3 based ionizing radiation detector systems. However, currently the problem is that all the existing analog and digital electronics are suited for only one platform.

The present invention features an electronic device and method for allowing the direct replacement of typical He3 gas tubes in He3 based ionizing radiation detectors using more cost effective gas tubes without the need to replace or significantly modify the ionizing radiation detection device or hardware platform.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems and methods for high voltage conversion and multiplication for ionizing radiation detection are disclosed. According to an aspect, an electronic device comprises at least one detector configured for detecting ionizing radiation. Further, the electronic device comprises a translator assembly coupled to the at least one detector and configured to convert a voltage from a first voltage level to a second voltage level, wherein the at least one detector operates at the first voltage level. Further, the translator assembly is configured to voltage isolate the at least one detector operating at the first voltage level from a coupled electronic circuit operating at the second voltage level. Inherent in the isolation is the ability to transform the impedance of the second detector to that of the first.

BRIEF DESCRIPTION OF THE DRAWINGS

Exemplary embodiments of the invention will now be explained with reference to the accompanying drawings, of which:

FIGS. 4A-4C are a block diagram showing a coupling between a gas tube and a translator assembly according to an embodiment of the present invention;

DETAILED DESCRIPTION

The present invention will now be described more fully hereinafter with reference to the accompanying drawings, in which the preferred embodiments of the invention are shown. This invention may be embodied in many different forms and should not be construed as limited to the embodiments set forth herein; rather, these embodiments are provided so that this disclosure will be thorough and complete, and fully convey the scope of the invention to those skilled in the art.

Figure 1:
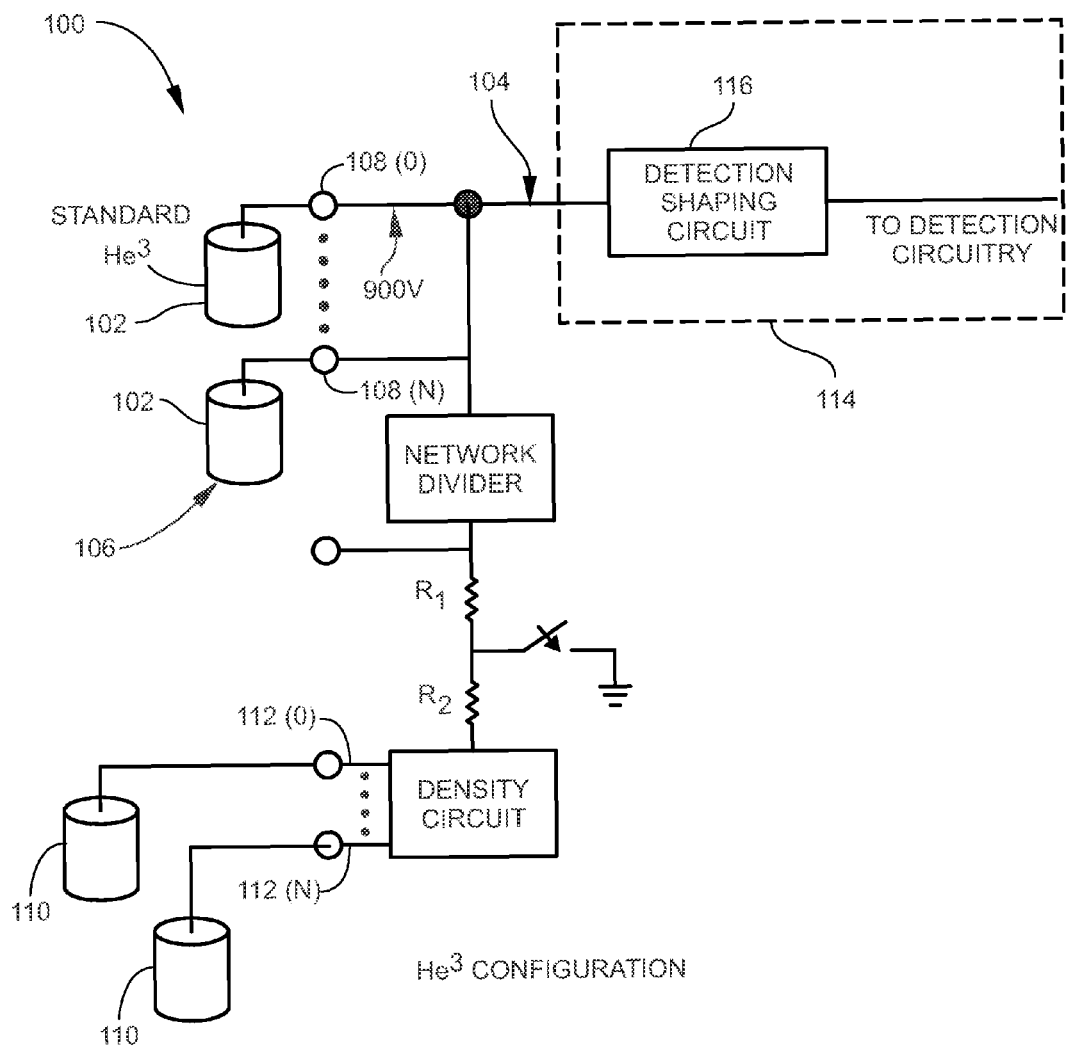
FIG. 1 is a block diagram showing a circuit of an ionizing radiation detector using at least one He3 gas tube as disclosed in the present invention.

Referring to FIG. 1, a block diagram showing a circuit showing a He3 based ionizing radiation detector 100 using at least one He3 gas tube 102 is provided. There are several types of detection technologies for ionizing radiation, many of which use high voltage sources from several hundred to several thousand volts. Typically, a proportional counter based on He3 is used to detect ionizing radiation. Shortly after September of 2001 the demand for He3 rose significantly resulting in a substantial increase in the He3 price. This was mainly the result of Homeland Security and other governmental agencies that began to systemically deplete the supply by installing new He3 ionizing radiation detectors 100 at ports and borders. In 2008 the United States used about 80,000 L of He3 gas, almost half of the supply, prompting the significant increase in He3 price. The supply of He3 is determined by the decay of Tritium, a slow process. Thus the supply is limited and cannot be easily replaced or increased.

There are at least 3 main alternatives to He3:Boron 10, Boron Triflouride (BF3) and Lithium-6. Boron 10 and BF3 based ionizing radiation detectors detect neutrons by electronically measuring a charge emission, and Lithium-6 detects absorbed neutrons by scintillated light. Prior to He3 based ionizing radiation detectors 100, the industry commonly used BF3 for detection. The main problem with a substantially pure BF3 detector is its toxicity; however, it is also less efficient than He3 based ionizing radiation detectors 100, so the ionizing detector made singularly of BF3 has to be physically larger. Other ionizing detector options, depending on the purpose include Boron or Lithium doped semiconductors, Li6 glass fibers, solid state detectors, Proportional counters, ionization, plastic detectors and Geiger Mueller (GM) counters, scintillation detectors, semiconductor detectors, solid state detectors, gas tube detectors, He3 detectors, gamma ray detectors and neutron detectors. The problem with all the different ionizing detectors is they all use different biasing voltages. As a non-limiting example, a He3 based ionizing radiation detector 100 may require 900V 104 while a BF3 based ionizing radiation detector may require 2700V, Lithium and semiconductors may require voltages significantly less. As He3 gas 106 becomes increasingly scarce, it is desired to explore other detector technologies that can directly replace or be substituted for direct replacement of He3 gas tubes 102 in He3 based ionizing radiation detectors 100. However, currently the problem is that all the existing analog and digital electronics are suited for only one platform.

For economic and supply reasons it may be desired to substitute the He3 gas tube with a Boron based or BF3 gas tube, discussed below. The He3 gas tubes may be used, for example in the Troxler Nuclear density gauges 3430, 3440, 3450, 4640, in oil well testing equipment, and other similar instrumentation. The substitution of Homeland Security and industrial measurement systems from He3 based gas tubes to another platform frees up He3 as it can be recovered for use in medical treatment and scientific research. Another purpose of this disclosure is to solve a problem for portable nuclear equipment such as in the road industry. This equipment can be used for spot checking moisture and density of pavement materials where a direct measurement is desired. As these gauges come in for service, or new ones are built, an integrated electronics plug-in is desirous and disclosed, and can be used in conjunction with Boron based gas tubes including lined tubes, straw tubes, and gas tubes of BF3 or non BF3.

As will be disclosed the purpose of the present invention to provide a translator assembly, allowing for example, a 2700V BF3 gas tube to directly replace a 900V He3 gas tube; thus allowing for a swap of detector platforms. This reduces the time and expense of redesigning existing electronic architectures saving costly time and money. It is also an aspect of the present invention to explore the mixing of technologies where one gas tube may be a hybrid of other gas tube methodologies increasing efficiency, resolution, and reducing toxicity for the environment. As a non-limiting example, reducing the volumetric proportions of BF3 gas, yet increasing the efficiency is desirable. One such technique is to coat the interior gas tube surfaces with Boron 10 (B-10), and mixing optimum proportions of BF3, Argon, and Neon, He4 and appropriate Halogens. In this example, the reduction of BF3 is accounted for by adding the B-10.

With continued reference to FIG. 1, as an example, an ionizing radiation detector circuit 100 is configured with at least one He3 gas tube 102 and coupled to one of at least one port 108(0:N), where there are N+1 ports configured to couple to an He3 gas tube 102. Further, the ionizing radiation detector circuit 100 is configured with at least one GM tube 110 coupled to a corresponding at least one port 112(0:N). The ionizing radiation detector circuit 100 operates biasing the He3 gas tube 102 to 900V as a non-limiting example. By biasing the He3 gas tube 102 to 900V a slow neutron interacting with the $^3$He gas produces a negative going pulse in detection circuitry 114. In this example, the detection shaping circuitry 116 can invert and square up the produced waveform for an ADC counting circuit (not shown), or prepare for a peak amplitude histogram collection of events. Once the ionization event takes place, the He3 gas in the tube needs time to recombine during a "quenching process". This can take place with an RC circuit (not shown) or by selection of the correct species of gas in the tube.

Figure 2:
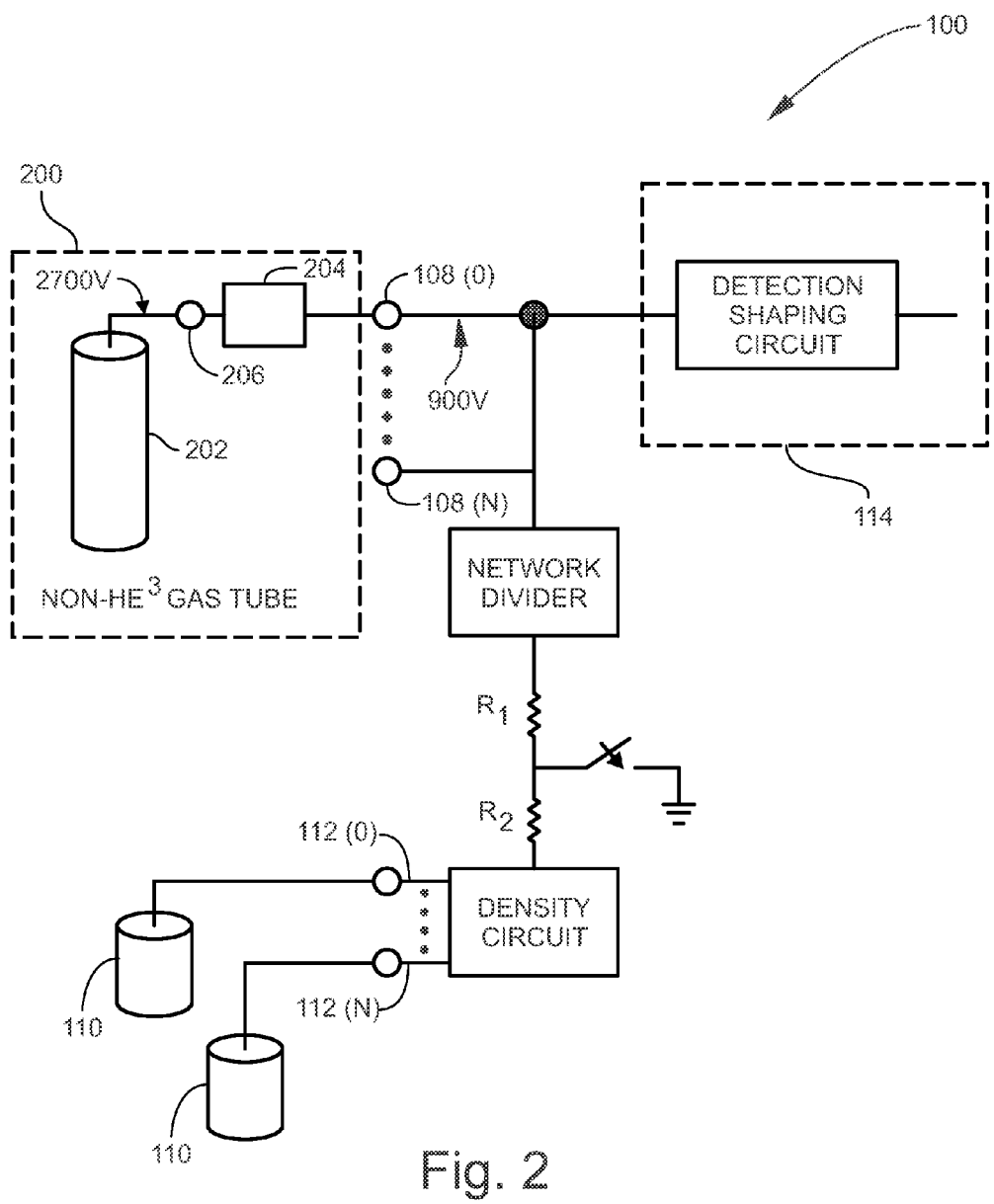
FIG. 2 is a block diagram showing a circuit of an ionizing radiation detector using at least one non-He3 based gas tube for detecting ionizing radiation according to an embodiment of the present invention.

With regard to FIG. 2, a block diagram showing a circuit of the ionizing radiation detector circuit 100 or detector coupled to at least one non-He3 based gas tube unit 200 for detecting ionizing radiation according to an embodiment of the present invention is disclosed. In this example the ionizing radiation detector circuit 100 is the same as described in FIG. 1 and the common elements will not be redescribed. In this example embodiment the at least one non-He3 based gas tube unit 200 is comprised of a non-He3 gas tube 202 and a translator assembly 204. The non-He3 gas tube 202 is coupled to the translator assembly 204 at a corresponding at least one non-He3 gas tube port 206. The voltage used for biasing the non-He3 gas tube 202 at port 206 may range to 4000 volts. As a non-limiting example, the non-He3 gas tube 202 may be a BF3 gas tube operating at a bias voltage of 2700V. Further, the non-He3 gas tube 202 may have the interior of the non-He3 gas tube 202 coated in a substantially pure Boron-10 coating. As an additional embodiment, the interior of the non-He3 gas tube 202 may be coated in a substantially pure Boron-10 coating and may also comprise a Penning gas for adjusting the count rate and operational parameters such as starting, breakdown and output voltage, and plateau. Additionally, the interior of the non-He3 gas tube 202 may be coated in a substantially pure Boron-10 coating and also comprises a Penning gas for adjusting the waveform signal.

With continued reference to FIG. 2, the adjusted waveform signal of the non-He3 gas tube 202 is desired to substantially match the waveform signal from the parent (or previous) He3 gas tube 102. While the waveform signals may differ or not be exactly the same, the waveform signal produced by the non-He3 gas tube 202 would be substantially similar to the He3 gas tube 102, such that the non-He3 based gas tube unit 200 could substitute for the He3 gas tube 102 as described in FIG. 1. The non-He3 gas tube unit 200 may be substituted for the He3 gas tube 102 by coupling the non-He3 gas tube unit 200 to a corresponding at least one port 108(0:N).

Figure 3A:
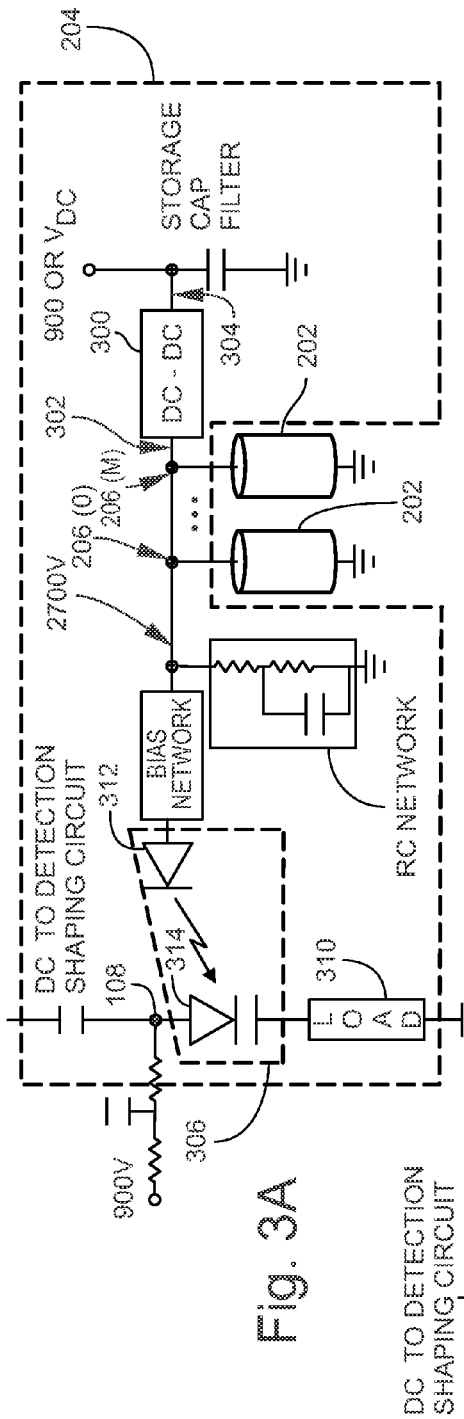
FIG. 3A-3B are a block diagram showing a translator assembly for use by a non-He3 gas tube to emulate a substantially similar waveform signal generated by an He3 gas tube in an ionizing radiation detector according to an embodiment of the present invention.
Figure 3B:
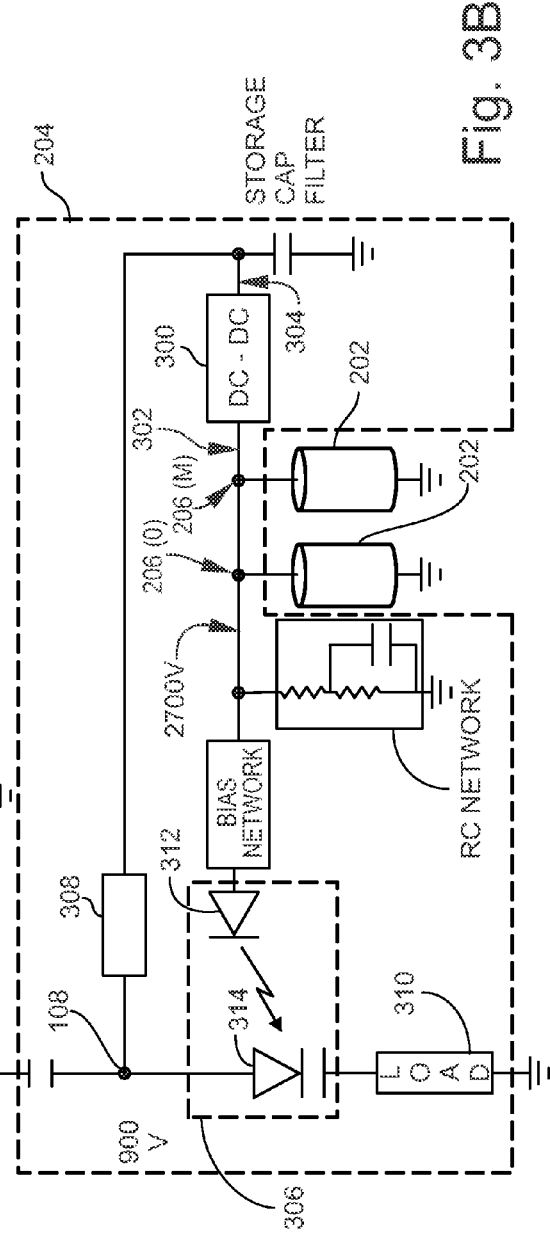

With regard to FIGS. 3A-3B, the block diagram shows a translator assembly 204 for use by at least one non-He3 gas tube 202 to produce a substantially similar waveform signal generated by a He3 gas tube 102 in an ionizing radiation detector 100 is provided in accordance with the present invention. As a non-limiting example, a BF3 based non-He3 gas tube 202 may operate at almost 3 times the voltage as the He3 gas tube 102, so a translator assembly 204 may be used to create a compatible waveform signal coupling to the at least one port 108(0:N). The translator assembly 204 may be coupled directly to the existing at least one port 108(0:N). As an example, the translator assembly 204 may convert the 900V DC bias to a 2700V bias for the BF3 based non-He3 gas tube 202. The translator assembly 204 is able to voltage isolate the non-He3 gas tube 202 from the other GM gas tube 110 and related circuitry. In this manner, isolating the lower voltage circuitry from the higher voltage circuitry. In alternative embodiments the translator assembly 204 may be attached to the new tube or integrated into the tube electronically. The translator assembly 204 may be surface mounted to the non-He3 gas tube 202.

The main difference between FIGS. 3A and 3B is where the 900V source is coupled. In FIG. 3B, the 900 V comes directly from the at least one port 108; in this case the lower voltage side. Conversely, in FIG. 3A, the 900 V supply to the DC-DC converter is not from the at least one port 108, but rather the bias of the converter comes directly from the systems HV power supply or VCC 300. Hence, the supply 300 is not affected by the ionizing radiation detection circuit 100 with each measurement pulse at the at least one port 108.

FIG. 3B shows the addition of a high impedance network 308. Without the high impedance network 308 and the storage capacitor filter, as the impedance simulating load 310 conducts via a photo transister, the voltage 108 would perturb the voltage 300. Therefore, a high impedance component 308 and the storage capacitor filter substantially keep the voltage 300 from varying. The high impedance network 308 may incorporate a low pass filter and other components to properly buffer the converter 300.

With reference to FIG. 3A, the non-He3 gas tube 202 shown coupled at non-He3 gas tube port 206 may be a BF3 based non-He3 gas tube 202 of pressures less than one atmosphere, or it could be a Boron-10 lined non-He3 gas tube 202 or alternatively may have a cathode fabricated from a boron carbide/aluminum matrix based non-He3 gas tube 202. Any of the aforementioned examples could be filled with a Penning gas or BF3 or a mix of a Penning gas and BF3. In this example, a standard He3 gas tube 102 is to be directly replaced with a Boron based non-He3 gas tube 202 operating at 2700 VDC. This is accomplished using the translator assembly 204 wherein the existing detection circuitry of 900V at the at least one port 108(0:N) is not directly coupled to the translator assembly 204 as shown in FIG. 3A.

The translator assembly 204 may further comprise a DC to DC converter 300 to translate a first voltage $V1(\omega)$ 302 produced by the non-He3 gas tube 202 to a second voltage $V2(\omega)$ 304 expected by the ionizing radiation detector circuit 100. In this example, the ionization pulses of the BF3 based non-He3 gas tube 202 are communicated to opto isolator 306 consisting of a photo diode (LED) 312 and a phototransistor 314. In this example, the pulse from the non-He3 as tube 202 optically excites the conduction band of the phototransistor 314 coupled to the at least one port 108. The at least one port 108 then conducts current through phototransistor 314 into the impedance simulating load 310, forming a pulse on a network (not shown) associated with the at least one port 108.

In this example, an isolator circuit 306 may be included in the translator assembly 204, wherein the isolator circuit 306 isolates the high voltages from the low voltage sections of the ionizing radiation detector 100, thus isolating the 2700V circuits from the 900V, in this example. In this manner, the circuit external to the translator assembly 204 receives a substantially similar voltage waveform as the voltage waveform produced by the He3 gas tube 102.

With continued reference to FIG. 3A, a 900V bias may be used to bias the translator assembly 204. As shown in FIG. 3B, a high input impedance 308 may also be used. Since the translator assembly 204 is coupled at the at least one port 108(0:N) a high input impedance 308 at the DC-DC converter 300 allows the detection shaping circuitry 114 to see only an impedance simulating load 310 whose current flow is determined by the isolator circuit 306. In this example, the isolator circuit 306 is preferably an optical isolator, optical switch or opto-isolator. Other high impedance switching circuitry could also be contemplated including High voltage gate operated SCR's FET's and Thyristors or lower voltage components with the proper networks. The DC-DC converter 300 transforms the proper operating voltage to the non-He3 gas tube 202. Each occurrence of an ionization event conducts a charge movement or change, the pulse triggers the isolator circuit 306, which puts 900V on the at least one port 108 (the original He3 gas tube 102 voltage) at the impedance simulating load 310. In this example, the 900V placed across the impedance simulating load 310 results in a current flow into the impedance simulating load 310 and the detection event signal waveform is presented to the detection shaping circuit 116 which substantially emulates the original voltage-current waveforms as though an He3 gas tube 102 was in place at the at least one port 108(0:N). High voltage components such as resistors, capacitors, diodes, transistors, may be necessary as known to those skilled in the art. As a non-limiting example, possible components may be CalRamic components, or high voltage multipliers supplied from VMI. VMI offers high voltage DC-DC converters, such as the MVM402P10, MVM302P08, and opto isolators such as the OC 100HG. In the event a lower voltage optical coupler or opto isolator is desired, a step down transformer can be inserted, capacitively coupled, or with the proper RC network, a voltage divider circuit could be incorporated. The divider network could be a T, H, or Pi network. The device translator assembly 204 may also incorporate surface mount technology, in as much that "through hole" technology is larger and may be less desirable, though yielding the same results. Temperature sensors could be employed for temperature data to be used for feedback or software correction.

Figure 5A:
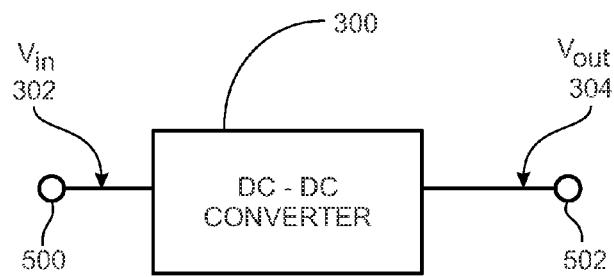
FIGS. 5A-5B is a block diagram showing a DC-DC converter comprised in a translator assembly for adapting a non-He3 gas tube based ionizing radiation detector according to an embodiment of the present invention.
Figure 5B:
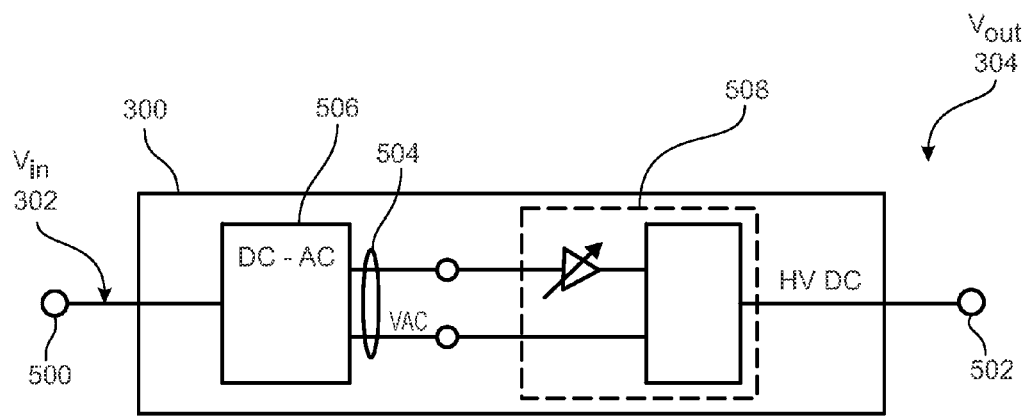

The DC-DC converter 300 can be an off the shelf part such as an miniature EMCO HV DC-DC converter, or the available voltage can be fed into an oscillating circuit, and an AC-DC converter used in place of the DC-DC converter 300 as indicated in FIG. 5B. The oscillation can be on the order of 5 KHz, but other frequencies such as 1 KHz to 100

KHz may be appropriate due to desired circuit size and power requirements. While FIGS. 3A and 3B show the DC-DC converter 300 coupled to the original high voltage supply of 900V, it should be noted that the high voltage 900V supply could be bypassed and just the low voltage primary VCC supply of 3-5V could be incorporated into a DC-DC converter 300 as it is capable of large multiplying factors.

With regard to FIGS. 4A, 4B, and 4C, the translator assembly 204 can couple directly into a high voltage connector 400 such as a plug, jack, wire, socket, TNC, BNC, SMA, Type N connection of the present ionizing radiation detector circuit ports 108(0:N). Additionally, the at least one non-He3 gas tube port 206 may be of a similar high voltage connector 402 such as a plug, jack, wire, socket, TNC, BNC, SMA, or Type N connection. Further, the at least one non-He3 gas tube port 206 may reside on the non-He3 gas tube 202. As shown in FIG. 4C the coupling between the non-He3 gas tube 202 and the translator assembly 204 may be over a distance by use of a high voltage coaxial wire 404. Additionally, the translator assembly 204 may be integrated into the detector or gas tube. As discussed above the translator assembly 204 may also be surface mounted to the detector or gas tube. If not surface mounted the translator assembly may be mounted proximate to the detector or gas tube, wherein proximate may be a coupling of the detector or the non-He3 gas tube 202 immediately adjacent to the translator assembly 204 or within a distance such that the waveform signal is not degraded to a state that it may not be adequately processed.

With regard to FIGS. 5A, 5B, a block diagram of a DC to DC converter 300 is provided. The DC to DC converter 300 is configured to convert a first voltage level Vin 500 to a second voltage level Vout 502. The first voltage level Vin 500 may be either a higher voltage or lower voltage than the second voltage level Vout 502. This may be desirable if the substitution detector is of a lower operating voltage than the original detector. Additionally, the DC to DC converter 300 may also be configured to bi-directionally convert voltages and waveform signals, such that a voltage or waveform signal presented at Vout 502 may be converted and produced at Vin 500. In other words, a reciprocal device exhibiting reciprocity. Additionally, the DC to DC converter may be configured to transform a presented voltage or waveform signal by a pre-defined factor, such as 1, 3, 5, 10, or 100 as a non-limiting example. Further, the DC to DC converter 300 may be configured to transform a presented voltage or waveform signal, dividing by a predetermined factor, such as $1/3$, $1/5$, $1/10$ or $1/100$.

With regard to FIG. 5B, as an example, a 900V DC voltage signal supplied at Vin 500 is converted from a DC voltage signal to an AC waveform 504 in a DC-AC converter 506 of 1-100 Khz. The AC waveform 504 is tuned and filtered by a high voltage multiplier 508 in preparation for the final conversion to 2700V at Vout 502. This multiplier may be a transformer, a diode tripling circuit, or an integrated circuit. The $^{10}$Boron doped tube is coupled at this point at 502 with proper capacitive and resistive components to drive the opto-isolator 306 which drives the impedance simulating load 310 of an impedance $Z(\omega)$. In alternative embodiments, the 900V DC voltage signal can be converted directly to the higher voltage using a high voltage DC-DC converter. This DC to DC converter 300 may be comprised of several component parts, or an integrated component could be purchased such as those offered by EMCO high voltage corporation.

Figure 6:
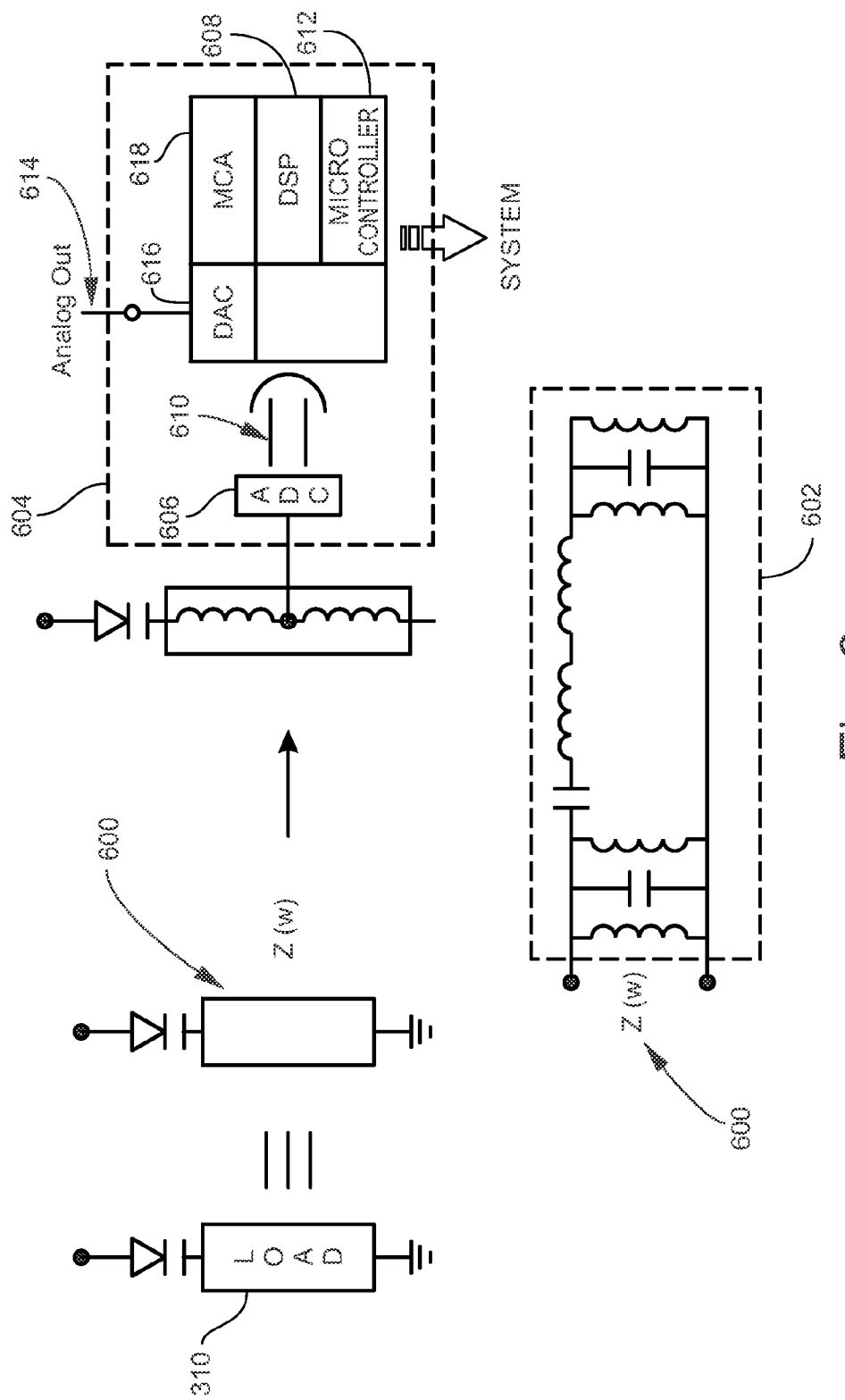
FIG. 6 is a block diagram showing an impedance simulating load used to substantially emulate a He3 gas tube based transfer function according to an embodiment of the present invention.

With regard to FIG. 6, substantially emulating the original pulse at the output of the translator assembly 204 an impedance simulating load 310 is shown. The impedance simulating load may comprise a passive or an active circuit or a combination of both. The impedance simulating load 310 has an impedance characteristic equal to $Z(\omega)$ 600. $Z(\omega)$.600 is equal to the impedance characteristic of the He3 gas tube 102 or detector that the non-He3 based gas tube unit 200 is designed to replace. In one embodiment a passive circuit 602 may be used to an impedance characteristic of $Z(\omega)$ 600. The simulated impedance is a passive network or a filter network substantially matching a predetermined waveform signal. In an alternative embodiment, an active circuit 604 may be desired for matching the impedance $Z(\omega)$ 600 of He3 gas tube 102 or detector and operating on that resulting waveform. Analog to Digital Converters (ADC) 606 and digital signal processors (DSP) 608 could also be used to convert the new waveform into a digital signal 610. Using the new waveform filtering and mathematical operations may be performed by a microcontroller 612, DSP 608 and software. The digital signal 610 may be converted back into an analog signal 614 by use of a typical digital to analog converter (DAC) 616. The microcontroller 612 outputs at least one of a digital and analog processed and shaped signal suitable for analysis. Alternatively, the digital signal 610 could be directly analyzed by the multi-channel analyzer (MCA) 618.

As with any part replacement in a nuclear instrument such as a moisture density gauge, the gauge should be recalibrated after the installation of translator assembly 204 and installation of the new detector. In the case of a nuclear density gauge, the calibration for the density involves obtaining the density response on an artificial calibration device such as a varying set of density standards, and neutron moderating material such as polypropylene or a hydrogen rich material. Here the response is recorded and a calibration curve representing the density as a function of count rate, or water content as a function of count rate is found. Calibration for homeland security detection instrumentation or oil field instrumentation also involves obtaining spectra or counts with test materials.

Other aspects of this invention involve the production of a safer, higher efficiency Neutron tube than the BF3 based non-He3 gas tube 202. Currently, for example, a BF3 based non-He3 gas tube 202 may be less efficient than a He3 gas tube. If the BF3 based non-He3 gas tube 202 is less efficient, then the less efficient gas tube may need to be larger. Furthermore, since the BF3 gas is toxic, it is recommended not to exceed a BF3 pressure above 70 cmHg. This precaution limits the amount of BF3 gas which may escape in the event a BF3 based non-He3 gas tube 202 is ruptured. Since the gas pressure is limited, other approaches to increasing the Boron cross section for neutron interaction are needed.

For example, a typical gas tube is about 6 inches long and 1 inch in diameter. Currently the practice is to fill the tube to 70 cmHg of BF3 to obtain 70% of the efficiency of a $^3$He3 gas tube. Other gas tubes incorporate Boron-10 coatings interior to the tube, and incorporate a Penning gas, which has no specific interaction with a neutron. Thus the BF3 gas is eliminated. It is an aspect of this invention to improve on this technology and incorporate Boron-10 coatings in the active area of the detector. By coating the interior of the tube with Boron-10 and a mix of BF3 and possibly a fill gas such as Argon, Neon, Bromine, CO2 or even $^4$He, the efficiency can be improved, while reducing to a much lower level the amount of BF3 gas. The coating thickness is of optimum thickness whereby it is of sufficient cross section, but not so thick that the ionization process cannot escape the active area of Boron-10. Typical layers of Boron-10 which may be 1 mg/cm² but not limited to that dose. The technologies to apply the Boron 10 may be thick film processes such as painting it on, or more controlled and cleaner processes, as used in thin film technology such as sputtering, CVD, Plasma enhanced CVD, evaporation, magnetron sputtering, glow discharge processes, conformal coatings, and the like. Boron-10 nanoparticles or Boron nitride have huge surface areas. The large surface area of the nano powder allows for neutron activated electrons to escape the surface and start an ionization event while offering a larger interactive cross section. These are spherically high surface area particles. The ability to deposit spherical nano particles interior the tube, along with a mix of BF3 gas and a Penning gas of at least Ar, Ne and a quench species can increase the efficiency while reducing the partial pressure of BF3 in the in the tube.

Different metals such as Boron carbide aluminum could be used as the actual tube material thus eliminating the Boron-10 coating or even enhancing it. In these tube designs, the anode wire diameter, cathode diameter, pressure, applied voltage, and temperature all affect the ionization process such as the ion dark space, necessary applied voltages and general tube performance. The diameter of the anode wire controls the magnitude of the intense Electric field which drives the ion avalanche process. Typical wire diameters may be on the order of 0.001 inches.

As a non-limiting example, the maximum pressure of BF3 gas allowable is 700 Torr. Lining the inside of the tube with Boron, then adding 5 cmHg-70 cmHg of BF3 will increase the efficiency above detectors that have not been lined. Adding a Boron lining will reduce the amount of BF3 gas needed and the difference can be made up in an Ar, Ne, and Br gas. CO2 can be used as a quench gas, in low partial pressures of BF3 where quenching is insufficient. Final pressures can be as much as 70 Psi. Other materials that may be used are Crystalline $^{10}$Boron, $^{10}$B Enriched Boron carbide, $^{10}$B enriched metal, Boride ceramics/Metal Borides and $^{10}$B enriched Boron Trifluoride.

Many modifications and other embodiments of the present disclosure set forth herein will come to mind to one skilled in the art to which the present disclosed subject matter pertains having the benefit of the teachings presented in the foregoing descriptions and the associated drawings. Therefore, it is to be understood that the present subject matter is not to be limited to the specific embodiments disclosed and that modifications and other embodiments are intended to be included within the scope of the appended claims. Although specific terms are employed herein, they are used in a generic and descriptive sense only and not for purposes of limitation.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. An electronic device comprising:
   at least one detector configured for detecting ionizing radiation; and
   a translator assembly coupled to the at least one detector and configured to convert a voltage from a first voltage level to a second voltage level, wherein the at least one detector operates at the second voltage level, wherein the translator assembly further comprises a DC-DC translator assembly and an impedance simulating load; and
   wherein the translator assembly is configured to voltage isolate the at least one detector operating at the second voltage level from a coupled electronic circuit operating at the first voltage level.

2. The electronic device of claim 1 wherein the detector is one of a Proportional counter, Geiger Mueller counter, scintillation detector, semiconductor detector, solid state detector, gas tube detector, He3 detector, BF3 detector, gamma ray detector, x-ray detector, alpha and beta detector, and neutron detector.

3. The electronic device of claim 1, wherein the translator assembly further comprises an electronic-isolator configured to isolate the first voltage level from the second voltage level.

4. The electronic device of claim 3, wherein the electronic-isolator is an optical isolator or an opto-isolator.

5. The electronic device of claim 1, wherein the translator assembly is coupled to the at least one detector with a high voltage coaxial cable.

6. The electronic device of claim 1, wherein the translator assembly is coupled to the at least one detector with a high voltage connector including a plug, jack, wire, socket, TNC, BNC, a SMA or Type-N connector.

7. The electronic device of claim 1, wherein the DC-DC translator assembly is configured with a high input impedance such that the coupled electronic circuit senses only the impedance of the impedance simulated load, and wherein the detector is configured to sense substantially the impedance of its detection circuitry.

8. The electronic device of claim 1, wherein the simulated impedance load is in communication with:
   an analog to digital translator receiving a waveform signal;
   a digital signal processor; and
   a microcontroller; and
   wherein the microcontroller is configured to filter and mathematically operate on the received waveform signal for pulse processing and shaping.

9. The electronic device of claim 8, wherein the microcontroller outputs at least one of a digital and analog processed and shaped signal suitable for analysis.

10. The electronic device of claim 8, wherein the impedance load is in further communication with:
    a multichannel analyzer, wherein the multichannel analyzer is configured to filter and mathematically operate on the received waveform signal.

11. The electronic device of claim 1, wherein the simulated impedance is at least one of an active and passive network or a filter network substantially to matching a predetermined waveform signal criteria.

12. The electronic device of claim 1, wherein the at least one detector is a neutron absorbing Boron based gas tube.

13. The electronic device of claim 12, wherein the interior of the at least one Boron gas tube is coated substantially in Boron-10.

14. The electronic device of claim 13, wherein the interior of the at least one Boron gas tube is coated substantially in Boron-10 and also comprises a Penning gas for adjusting the count rate.

15. The electronic device of claim 13, wherein the interior of the at least one Boron gas tube is coated in Boron-10 and also comprises a mix of a Penning gas and a BF3 or radiation interacting (ionizing) gas for adjusting the waveform signal and efficiency.

16. The electronic device of claim 1, wherein the second voltage level is in a range of 2000 volts to 3500 volts.

17. The electronic device of claim 1, wherein the second first voltage level is in a range of 800-1000 volts.

18. The electronic device of claim 1, wherein the first voltage level is in a range of 3-200 volts.

19. The electronic device of claim 1, wherein the second voltage level is in a range of 500 volts to 1000 volts.

20. The electronic device of claim 1, the at least one BF3 gas tube coupled to the translator assembly outputs a substantially similar voltage waveform to a Helium-3 gas tube appropriately biased by a first voltage.

21. The electronic device of claim 1, wherein the translator assembly is surface mounted.

22. The electronic device of claim 1, wherein the translator assembly is integrated into the detector.

23. The electronic device of claim 1, wherein the translator assembly is attachable to the detector or mounted proximate the detector.

24. The electronic device of claim 1, wherein substantially any remaining systematic nuclear response error as a result of the translated voltage waveform output from the electronic device is corrected in a calibration process.

25. The electronic device of claim 1, wherein the second voltage level is in a range of 3 volts to 200 volts.

26. An electronic device comprising:
at least one detector configured for detecting ionizing radiation; and
a translator assembly coupled to the at least one detector and configured to convert a voltage from a first voltage level to a second voltage level, wherein the at least one detector operates at the second voltage level; and
wherein the translator assembly is configured to voltage isolate the at least one detector operating at the second voltage level from a coupled electronic circuit operating at the first voltage level, and
wherein the translator assembly supplies a current in the range of 1 µA to 10 mA.

27. A method comprising:
detecting ionizing radiation using at least one detector;
converting a voltage from a first voltage level to a second voltage level using a translator assembly coupled to the at least one detector, wherein the at least one detector operates at the second voltage level; and
voltage isolating the at least one gas tube detector operating at the first second voltage level from a coupled electronic circuit operating at the second first voltage level,
wherein the converting the voltage from the first voltage level to the second voltage level is by the translator assembly further comprising:
a DC-DC translator assembly; and
an impedance simulating load.

28. The method of claim 27, wherein the detector is one of a Proportional counter, Geiger Mueller counter, scintillation detector, semiconductor detector, solid state detector, gas tube detector, 3He detector, BF3 detector, gamma ray detector, x-ray detector, alpha or beta detector, and neutron detector.

29. The method of claim 27, wherein the voltage isolating uses the translator assembly further comprising an electronic isolator configured to isolate the first voltage level from the second voltage level.

30. The method of claim 27, wherein the electronic-isolator is an optical isolator or an opto-isolator.

31. The method of claim 27, wherein the converting the voltage from the first voltage level to the second voltage level is by the translator assembly coupled to the at least one detector with a high voltage coaxial cable.

32. The method of claim 27, wherein the converting the voltage from the first voltage level to the second voltage level is by the translator assembly coupled to the at least one detector with a high voltage connector including a plug, jack, wire, socket, TNC, BNC, a SMA or Type-N connector BNC, a SMA or Type-N connector.

33. The method of claim 27, wherein the impedance simulating load is at least one of an active and passive network or a filter network to substantially matching a predetermined waveform signal.

34. The method of claim 27, wherein the converting the voltage from the first voltage level to the second voltage level uses the DC-DC translator assembly configured with a high input impedance such that the coupled electronic circuit senses only the impedance of the simulated impedance load.

35. The method of claim 27, wherein the converting the voltage from the first voltage level to the second voltage level uses the impedance load in communication with:
an analog to digital translator receiving a waveform signal;
a digital signal processor;
a microcontroller; and
wherein the microcontroller is configured to filter and mathematically operate on the received waveform signal for pulse processing and shaping.

36. The method of claim 35, wherein the simulated impedance load waveform is further processes and shaped by:
filtering and mathematically operating on the received waveform signal by a multichannel analyzer.

37. The method of claim 27, detecting ionizing radiation using at least one detector, wherein at least one detector is a Boron Triflouride (BF3) gas tube.

38. The method of claim 37, further comprising coating the interior of the at least one Boron gas tube with a substantial coating of Boron-10.

39. The method of claim 38, further comprising coating the interior of the at least one Boron gas tube with Boron-10 and using a Penning gas for adjusting the count rate tube parameters and efficiency.

40. The method of claim 39, wherein the Penning gas comprises a mix of Argon, Neon and Bromine.

41. The method of claim 38, further comprising coating the interior of the at least one Boron gas tube with substantially a Boron-10 coating and using a Penning gas for adjusting the waveform signal.

42. The method of claim 38, wherein the at least one Boron gas tube comprises a mix of Penning gas and BF3 or radiation interacting gas.

43. The method of claim 42, wherein the coating the interior of the at least one Boron gas tube comprises using a range of 0.75 mg/cm$^2$ to 1.25 mg/cm$^2$ of substantially pure Boron-10, a range of 0 to 70 mm/Hg of BF3 and a range of 70 to 0 mm/Hg of Penning gas.

44. The method of claim 37, further comprising outputting a substantially similar voltage waveform to a Helium-3 gas tube properly biased by at least one BF3 gas tube coupled to the translator assembly.

45. The method of claim 27, wherein the operating range of the second voltage level is in a range of 3 volts to 200 volts and 2000 volts to 3500 volts.

46. The method of claim 45, wherein the operating range of the first voltage level is in a range of 800-1000 volts.

47. The method of claim 27, further comprising surface mounting the translator assembly on the at least one detector.

48. The method of claim 27, further comprising integrating the translator into the detector.

49. The method of claim 27, further comprising mounting the translator proximate the detector and in wired communication.

50. The electronic device of claim 27, further comprising removing substantially any systematic nuclear response error from the voltage waveform output from the electronic device by correcting using a calibration process.

51. A method comprising:
  detecting ionizing radiation using at least one detector;
  converting a voltage from a first voltage level to a second voltage level using a translator assembly coupled to the at least one detector, wherein the at least one detector operates at the second voltage level; and
  voltage isolating the at least one detector operating at the second voltage level from a coupled electronic circuit operating at the first voltage level, and
  wherein the method further comprises supplying a current in the range of 1 µA to 1 mA by the translator assembly.

* * * * *